(12) United States Patent
Chien

(10) Patent No.: US 7,609,316 B2
(45) Date of Patent: Oct. 27, 2009

(54) OPTICAL VIEWFINDER SYSTEM OF CAMERA

(75) Inventor: Yang-Chang Chien, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 395 days.

(21) Appl. No.: 11/411,654

(22) Filed: Apr. 26, 2006

(65) Prior Publication Data

US 2007/0046806 A1 Mar. 1, 2007

(30) Foreign Application Priority Data

Aug. 23, 2005 (CN) .................. 2005 1 0036805

(51) Int. Cl.
*H04N 5/225* (2006.01)
(52) U.S. Cl. .................. 348/341; 348/374
(58) Field of Classification Search .......... 348/333.09, 348/341, 373–376; 396/373, 382, 384, 385
See application file for complete search history.

(56) References Cited

U.S. PATENT DOCUMENTS

| 4,732,438 A * | 3/1988 | Orbach et al. ............... 348/341 |
| 2004/0080656 A1* | 4/2004 | Higuchi et al. ............. 348/335 |

FOREIGN PATENT DOCUMENTS

| CN | 1302152 A | 7/2001 |
| CN | 2519304 Y | 10/2002 |

\* cited by examiner

*Primary Examiner*—Timothy J Henn
(74) *Attorney, Agent, or Firm*—Steven M. Reiss

(57) ABSTRACT

An optical viewfinder system includes: a lens element group (22), a beam splitter (30) and a window (40). The beam splitter is disposed behind the lens group. The window located behind the beam splitter, the lens element group and the beam splitter being located on a line with the window. The optical viewfinder system provides a better quality and power saving for a portable electronic device.

5 Claims, 3 Drawing Sheets

OPTICAL VIEWFINDER SYSTEM OF CAMERA

BACKGROUND OF THE INVENTION

1. Field of the Invention

The present invention relates to an optical system for observing an object to be photographed, and more particularly to an optical viewfinder system suitable for a camera.

2. Discussion of the Invention

When taking a picture, it is necessary to know not only in what direction to aim the camera but also how much of the scene will be included in the picture. For this reason practically every modern camera has a viewfinder of some kind.

For a portable electronic device, a liquid crystal display panel is used to show the image of the digital camera module. However, the liquid crystal display (LCD) consumes a substantial amount of power, especially considering the limited amount of power that can be stored in the typical battery system of a digital camera a mobile phone or a PDA. Furthermore, although LCD resolution has experienced great progress, image displays are still not clear enough to check the focusing effects and imaging effects. As such, electronic viewfinders are not very suitable for use in mobile phones or PDAs, which need to be small, high quality with low power consumption.

Therefore, an optical viewfinder system is desired in order to overcome the above-described shortcomings.

SUMMARY OF THE INVENTION

In one embodiment thereof, an optical viewfinder system includes: a lens element group, a beam splitter and a window. The beam splitter is disposed behind the lens group. The window located behind the beam splitter, the lens element group and the beam splitter being located in a line with the window.

Other advantages and novel features will become more apparent from the following detailed description when taken in conjunction with the accompanying drawings.

BRIEF DESCRIPTION OF THE DRAWINGS

Many aspects of the optical viewfinder system can be better understood with reference to the following drawings. The components in the drawings are not necessarily drawn to scale, the emphasis instead being placed upon clearly illustrating the principles of the present digital camera module and its potential applications. Moreover, in the drawings, like reference numerals designate corresponding parts throughout the several views.

DETAILED DESCRIPTION OF THE EMBODIMENTS

Figure 1:
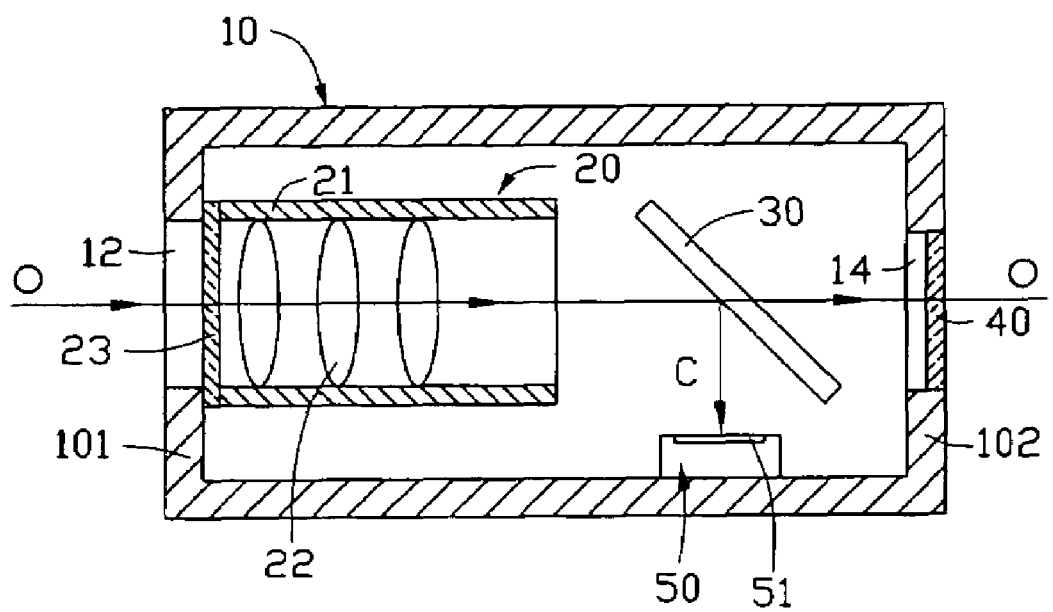
FIG. 1 is a cut-away view of a digital camera module with the optical viewfinder system according to one embodiment.

Referring now to the drawings in detail, FIG. 1 shows a digital camera module 100 in accordance with one embodiment. The digital camera 100 generally includes a main body 10, a lens 20, a beam splitter 30, a window 40, and an image sensor 50. Two optical paths are illustrated by lines OO and OC.

The main body 10 is substantially a hollow cylinder, thus receiving the lens 20, the beam splitter 30 and the image sensor 50. The main body 10 includes a first end 101 and an opposite second end 102. The first end 101 has a first hole 12 defined therein, and the second end 102 has a second hole 14 defined therein. The first hole 12 is aligned with the second hole 14.

The lens 20 is fixed on the inward wall of one end of the main body 10, adjacent to the first hole 12. The lens 20 includes a barrel 21 and a lens elements group 22 received in the barrel 21. The barrel 21 is substantially a hollow cylinder. The lens elements group 22 is made up of several lens elements (not individually labeled), and the first lens elements group 22 focuses light which enter from the outside. Also disposed in the barrel 21 is a glass board 23. The glass board 23 is disposed before the lens elements group 22 and covers one end of the barrel 21. As such, the glass board 23 protects the lens elements group 22 from potentially being scraped or otherwise abraded and keeps dust from entering the system.

The beam splitter 30 is secured behind the lens 20. The beam splitter 30 may divide incoming light into two parts. One part is reflected to the image sensor 50, and the other part is transmitted to the window 40. The beam splitter 30 may reflect 50% of the light, and pass through 50% of the light.

The window 40 is situated at the second hole 14 of the main body 10. The window 50 is a glass board which can keep dust from entering the system. Users may see the view through the window 40.

The image sensor 50 is fixed in the main body 10. The image sensor 50 includes an image plane 51, and is usually a charge-coupled device (CCD) or a complementary metal-oxide semiconductor (CMOS). The image sensor 50 is located at the position where the light is reflected to by the beam splitter 30. The image sensor 50 may transform light signals to electronic signals.

In operation, the light reflected from an image object (not shown) pass through the glass board 23 and the lens elements group 22. The lens element group 22 focuses the light, this focused light passes through the beam splitter 30. The beam splitter 30 will partially lead (i.e. redirect) the light to arrive at the image sensor 50. The image sensor 50 will transfer the light signal to an electronic signal, permitting the storage of the image information in a memory of the digital camera. At the same time, the beam splitter 30 will transmit the remaining light to the window 40 so as to allow the image to be photographed to be seen through the window 40. The lines OO and OC show the light being divided into two parts.

Figure 2:
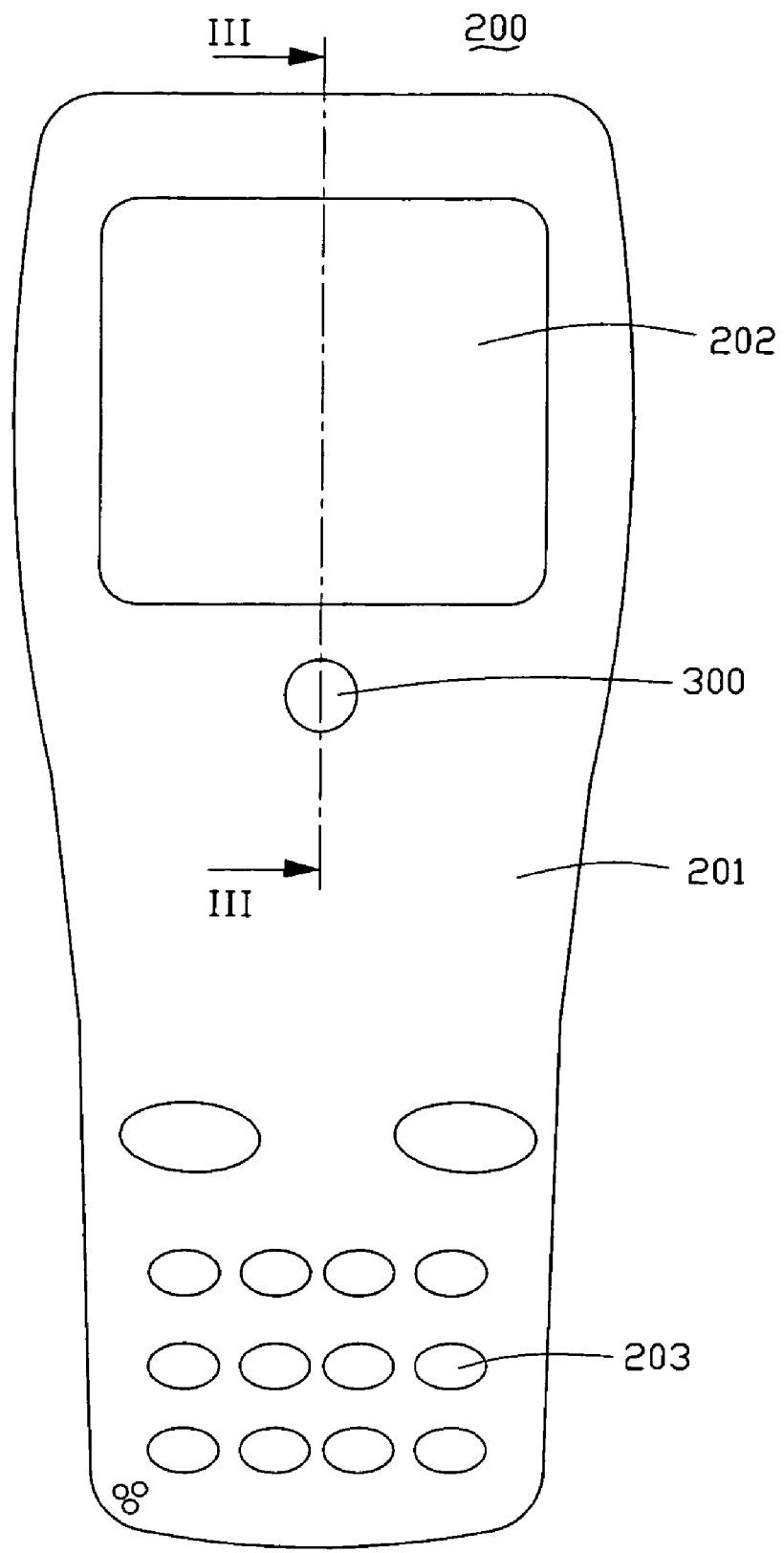
FIG. 2 is a top plan view of a mobile phone according to another embodiment.
Figure 3:
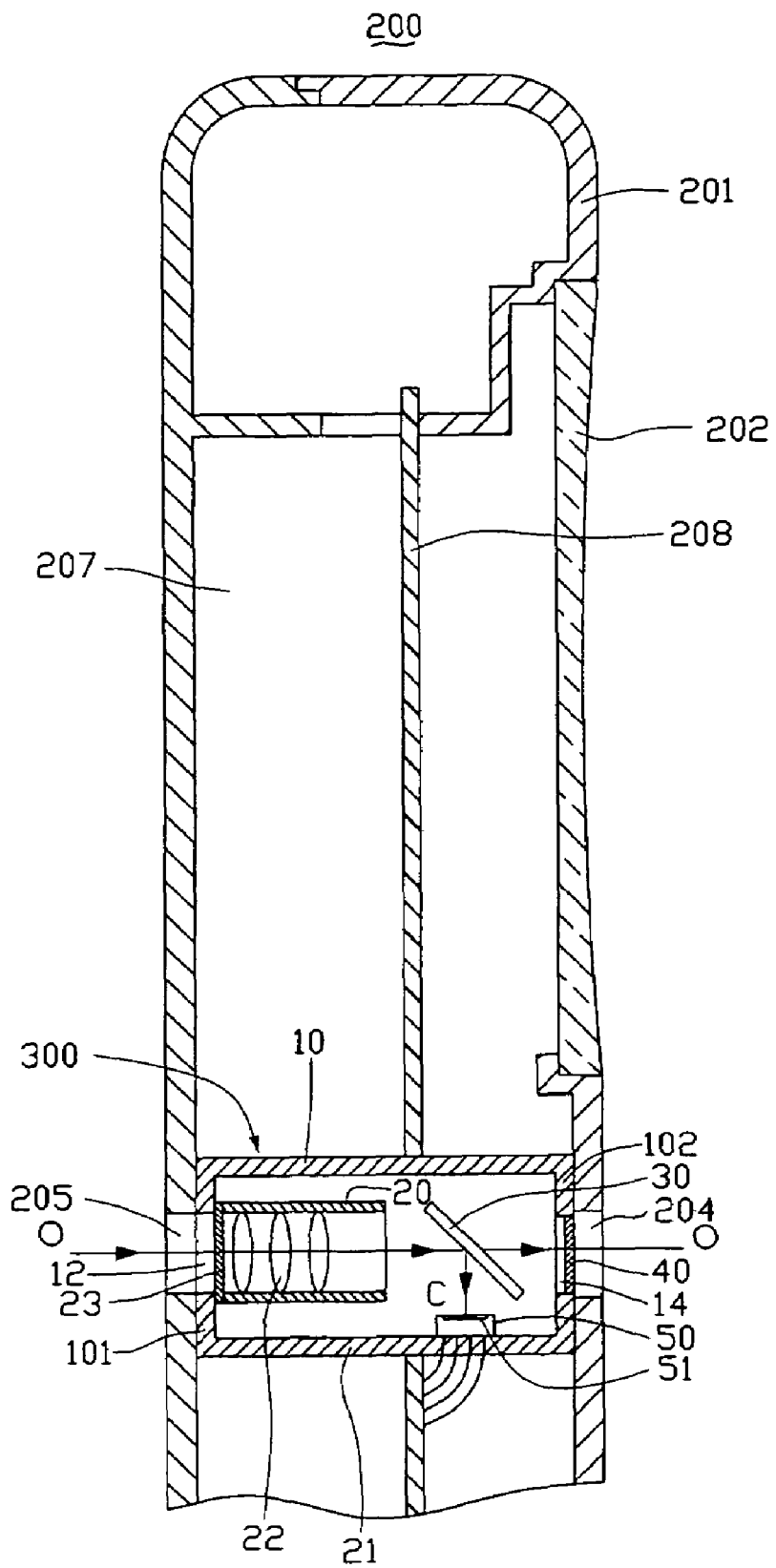
FIG. 3 is a cross-sectional view taken along line III-III of FIG. 2, showing a digital module used in the mobile phone.

In another embodiment, the digital camera may be used in portable electronic devices such as mobile phones. Referring to FIG. 2 and FIG. 3, the mobile phone 200 includes a body 201 and incorporates a digital camera 300. One end of the body 201 disposes a display 202, while another opposite end of the body 201 has a keypad 203 disposed thereon. A printed circuit board 208 is housed in the body 201 of the mobile phone 200. An optical opening 204 is defined in a middle of one side of the body 201 of the mobile phone 200, and an opposite optical hole 205 is defined in the side opposite to the side carrying the display 202 of the mobile phone 200. The body 201 has a body cavity 207 therein. A digital camera 300 is secured at or at least proximate to the optical opening 206 within the body cavity 207, such that light can enter through optical opening 204 and into digital camera 300 (specifically barrel 20). Accordingly, the optical opening 204 and the optical hole 205 are within the optical path (not labeled in FIG. 3) of the digital camera 300.

The digital camera 300 is substantially the same as the digital camera 100 of the first embodiment. A different point is that the image sensor 50 will connect with the printed circuit board 208 of the mobile phone 200 through lead lines (in the form of wires, printed circuitry, pin connectors, etc., depending on the system configuration). The embodiment of the invention may use the optical viewfinder system and greatly decrease consuming power, which would help satisfy the requirement of saving power for the portable electronic device. Furthermore, the optical viewfinder system can help viewers view the objects.

In still further alternative embodiments, the first hole 12 and the second hole 14 may be replaced with transparent portions so as to pass through the light. Understandably, the lens element group and the beam splitter are located on a line with the window, thereby simplifying the optical elements.

In the above-mentioned embodiments, the beam splitter 30 acts as a directing apparatus (i.e. dividing apparatus) for dividing two path ways. Understandably, the beam splitter 30 disclosed above may be replaced with other structures such as a half-transmitting prism.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A digital camera module comprising:
    a main body being a hollow cylinder having a longitudinal body axis, and including a first end and a second end;
    a barrel being fixed on an inner wall of the first end and having a longitudinal barrel axis;
    a lens element group received in the barrel and having a longitudinal lens axis; the body, barrel, and lens axes being parallel, wherein light passing through the lens element group is focused by the lens element group;
    a beam splitter received in the main body and located behind the lens element group and for receiving a focused light;
    a window positioned in line with the lens and the beam splitter; and
    an image sensor positioned at a location where the focused light reflected towards the image sensor is not reflected or refracted in the distance between the beam splitter and the image sensor;
    wherein the focused light contacting the beam splitter is directed in a first direction towards the window and a second direction towards the image sensor within the digital camera module.

2. The digital camera module as claimed in claim 1, wherein the beam splitter reflects 50% of incident light, and transmits 50% of incident light.

3. The digital camera module as claimed in claim 1, wherein the window is a glass board, the glass board being located before the lens element group and covering one end of the main body.

4. The digital camera module as claimed in claim 1, wherein the main body has a first hole and a second hole defined therein, the first hole is aligned with the second hole, and the window is disposed at the second hole.

5. The digital camera module as claimed in claim 1, wherein the image sensor is positioned on the main body.

* * * * *

UNITED STATES PATENT AND TRADEMARK OFFICE
CERTIFICATE OF CORRECTION

PATENT NO. : 7,609,316 B2  Page 1 of 1
APPLICATION NO. : 11/411654
DATED : October 27, 2009
INVENTOR(S) : Yang-Chang Chien It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 579 days.

Signed and Sealed this

Twelfth Day of October, 2010

David J. Kappos
*Director of the United States Patent and Trademark Office*